Figure 1:
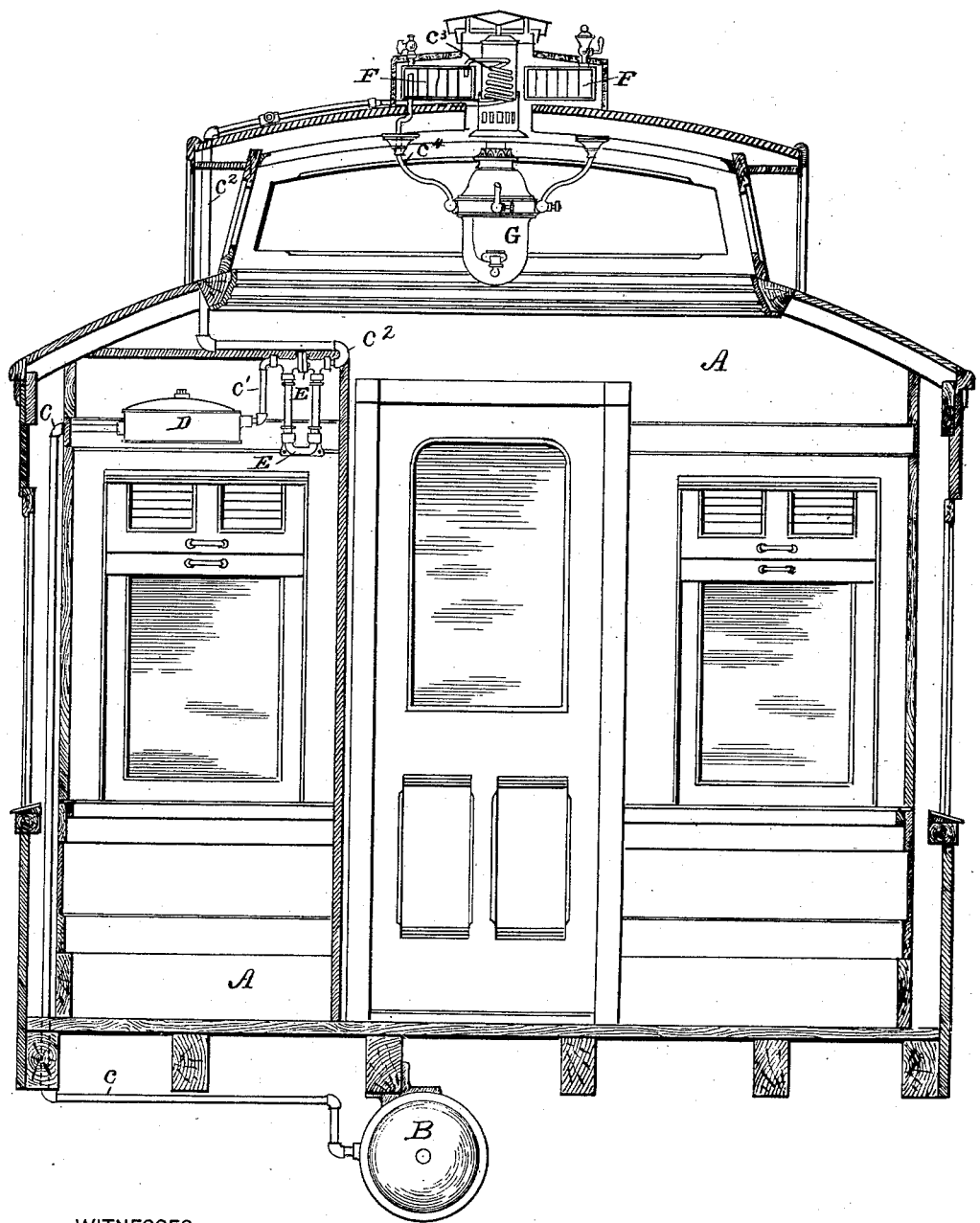

(No Model.) 2 Sheets—Sheet 1.

C. B. DUDLEY.
INDICATOR FOR MEASURING THE FLOW OF LIQUIDS IN CONDUITS.

No. 375,054. Patented Dec. 20, 1887.

WITNESSES: INVENTOR (No Model.) 2 Sheets—Sheet 2.
C. B. DUDLEY.
INDICATOR FOR MEASURING THE FLOW OF LIQUIDS IN CONDUITS.
No. 375,054. Patented Dec. 20, 1887.
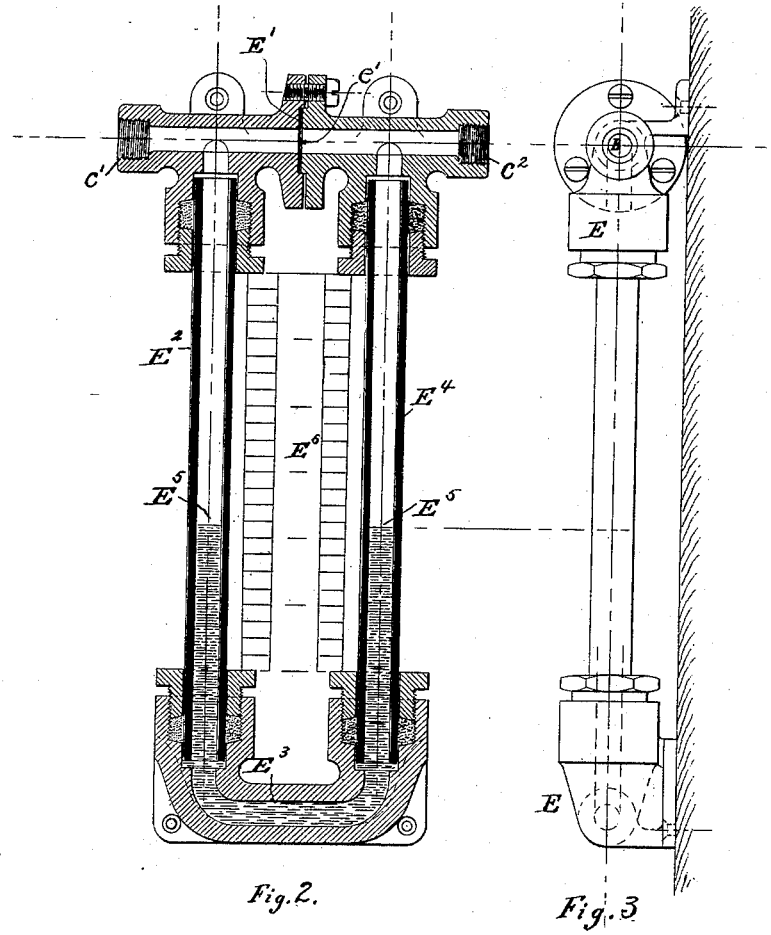
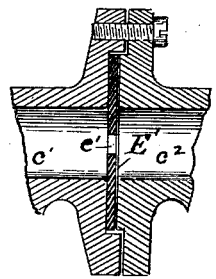
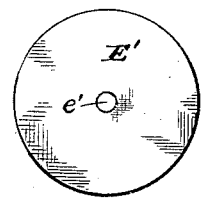

UNITED STATES PATENT OFFICE.

CHARLES B. DUDLEY, OF ALTOONA, PENNSYLVANIA.

INDICATOR FOR MEASURING THE FLOW OF LIQUIDS IN CONDUITS.

SPECIFICATION forming part of Letters Patent No. 375,054, dated December 20, 1887.

Application filed May 22, 1886. Serial No. 203,002. (No model.)

*To all whom it may concern:*

Be it known that I, CHARLES B. DUDLEY, of Altoona, Blair county, State of Pennsylvania, have invented a new and useful Improvement in Indicators for Measuring the Flow of Fluids in Conduits, of which the following is a true and exact description, due reference being had to the drawings which accompany and form part of this specification.
The object of my invention is to provide a device which can be attached to a pipe through which air, gas, or other fluid is caused to flow, and which will at all times indicate the amount of such fluid passing through such conduit, and more especially to arrange such a device in connection with a carburetor forming part of the lighting system of a railway-car or other chamber, so as to utilize it to detect the efficiency with which the carburetor is acting, as well as the rate at which the gas-supply is being drawn upon.

In the construction of my indicator I make use of the principle or rule that the amount of gas or fluid passing through an aperture in a thin plate is a function of the size and shape of the aperture and of the difference in pressure on the sides of the thin plate. The size and shape of the aperture being made a constant, the amount of any gas or fluid passing through it varies approximately as sixty-seven (67) times the square root of the difference in pressure on the two sides of the plate, (the difference in pressure being measured in inches of water,) and by providing a device which will at all times measure the difference in pressure on the two sides of the diaphragm, and uniting with it a scale calculated on the above rule, I have an indicator which will at all times show the rate of flow of the gas or fluid through the pipe.

It is of course well known that in using carbureted air or gas for illumination the quantity of the carrier-gas required will vary according as it is more or less perfectly carbureted, and that as the carburetor becomes exhausted, or for any other reason does not impart its hydrocarbon to the gas in proper quantity, a much greater quantity of the carrier-gas is consumed than when it is working properly; and it is evident that when an excessive supply of the carrier-gas becomes necessary, it is a sure indication that the carburetor needs either refilling or repair. By combining my before-described indicator with the supply-pipe of the carburetor I therefore provide the attendant with means for ascertaining at all times the condition of the carburetors under his charge. When, as in case of railway-cars, the carrier-gas is drawn from the air-brake system or storage-tanks filled with compressed gas, it is important not to draw too rapidly upon the gas-supply for the lighting of the car, this indicator is very valuable; and in such case I prefer to introduce a governor between the supply-reservoir and the indicator, so that the pressure on the side of the diaphragm toward which the gas is flowing may be as nearly constant as possible.

Reference is now had to the drawings, which show my invention as applied to a railway-car, and in which—

Figure 1 is a cross section through a railway-car showing the air storage cylinder, governor, indicator, and carburetor arranged and connected together in the way best adapted for carrying out my invention. Fig. 2 is a central sectional elevation of an indicator constructed in accordance with my invention; Fig. 3, a side elevation of the same; Fig. 4, an enlarged view of the diaphragm as shown in Fig. 2, and Fig. 5 a front view of said diaphragm.

A is a railway-car.

B is the air-storage cylinder; C, a pipe leading from said cylinder to a regulator or governor, D; C', a pipe leading from the governor to E, which is my indicator for showing the rate of flow of the gas, and which in this instance is constructed, as shown in Fig. 2, a diaphragm, E', being secured between the pipe C' and the pipe $C^2$, which forms a continuation of the same conduit, said diaphragm being a thin plate of metal and having an orifice or perforation, $e'$, of determined form and size. On either side of the diaphragm E' strong glass tubes $E^2$ $E^4$ are securely and tightly inserted in the pipes C' and $C^2$, their lower ends being united by a U-shaped pipe or conduit, $E^3$, and a continuous conduit being thus formed through the tubes $E^2$ $E^4$ around the diaphragm E'. Into this U-shaped conduit, which is of course placed in a vertical position, mercury, $E^5$, is poured in quantity sufficient to insure its acting as a seal to prevent any gas or fluid from passing from the tube $E^2$ to the tube $E^4$, and a scale, $E^6$, calculated, as hereinbefore described, is arranged in relation to the mercury-column in one or both tubes, so that the height of the said column shall, by indicating the difference in pressure in the two sides of the diaphragm, show the rate at which the gas is flowing through the orifice $e'$. The tubes $E^2$ $E^3$ $E^4$ thus constitute a mercury pressure-gage.

Returning to Fig. 1, $C^2$ is a pipe leading from the indicator, and, as shown in the drawings, through a heating-coil, $C^3$, to a carburetor, F, from which a pipe, $C^4$, conducts the gas to a burner, G.

The relative operation of the aforesaid devices has already been sufficiently described, and can be easily followed in the drawings, and while I believe the arrangement shown to be well adapted for practical use, it is obviously capable of many modifications. Thus the indicator may be placed between the carburetor and the burners or between the storage-cylinder and the regulator. The governor will not always be necessary, and, as already noted, the indicator may be used in connection with any source of supply. The indicator itself may be constructed with a flexible diaphragm, instead of a liquid-column, a suitable device being employed for indicating the degree of distortion of the diaphragm upon a properly-calculated scale; or any other device may be used in connection with the perforated diaphragm $E'$ which will offer yielding resistance, which can be used to measure the difference in pressure on its two sides. Water or any other liquid may also be used in the U-tube shown, and almost any required degree of sensitiveness thus obtained.

Having now described my invention, what I claim as new, and desire to secure by Letters Patent, is—

1. A device for measuring the rate of flow of fluids in conduits, consisting of a diaphragm, $E'$, having a known aperture, $e'$, secured in the conduit, and a mercury-gage, $E^2$ $E^3$ $E^4$, or its equivalent, as described, for measuring the difference in pressure on the two sides of said diaphragm $E'$, substantially as specified.

2. The combination, with a carburetor, of a rate-of-flow indicator, E, or its equivalent, as described, situated in a gas-conduit leading to or from the carburetor, substantially as and for the purpose specified.

3. The combination of a pressure regulator or governor situated in a gas supply conduit leading to a carburetor, a carburetor and a rate of-flow indicator, E, or its equivalent, as described, situated in the conduit between the governor and carburetor, substantially as and for the purpose specified.

4. The combination of an air-storage cylinder or other reservoir of compressed gas, a governor for regulating the pressure, a rate-of-flow indicator, E, or its equivalent, as described, and a carburetor, all arranged substantially as shown and described, and for the purpose specified.

CHAS. B. DUDLEY.

Witnesses:
FREDERICK N. PEASE,
E. C. STOCKTON.